United States Patent [19]

Dunaway et al.

[11] Patent Number: 4,898,761
[45] Date of Patent: Feb. 6, 1990

[54] BARRIER FABRIC AND METHOD

[75] Inventors: Jerry A. Dunaway, Old Hickory; Leon H. Zimmerman, Nashville; Nancy T. LaTondress, Mt. Juliet, all of Tenn.

[73] Assignee: Reemay, Inc., Old Hickory, Tenn.

[21] Appl. No.: 281,104

[22] Filed: Dec. 7, 1988

Related U.S. Application Data

[63] Continuation-in-part of Ser. No. 96,048, Sep. 11, 1987, abandoned.

[51] Int. Cl.$^4$ ................................................. B32B 7/00
[52] U.S. Cl. .............................. 428/137; 156/244.18; 156/244.19; 427/355; 427/358; 428/290; 428/300; 428/315.5

[58] Field of Search ............... 428/131, 137, 288, 290, 428/300, 315.5; 427/355, 358; 156/244.18, 244.19

[56] References Cited

U.S. PATENT DOCUMENTS 4,582,750  4/1986  Lou et al. .......................... 428/288
4,684,568  8/1987  Lou .................................... 428/265

Primary Examiner—Marion C. McCamish
Attorney, Agent, or Firm—Juettner Pyle Lloyd & Verbeck

[57] ABSTRACT

A barrier fabric is provided which is impermeable to liquids and permeable to vapor. A polymer film is laminated to a porous fibrous web. The composite web is then needled repeatedly with fine conical needles to provide micropores through the film.

12 Claims, 1 Drawing Sheet

BARRIER FABRIC AND METHOD

CROSS REFERENCE

This application is a continuation-in-part of copending application Ser. No. 96,048, filed Sept. 11, 1987 now abandoned.

BACKGROUND OF THE INVENTION

This invention relates to a composite fabric which is essentially impermeable to liquids and permeable to vapors, and is particularly suitable for use as a barrier fabric in building construction.

Various types of fabrics are used by the building industry, including those which repel liquid water from the exterior but allow transmission of moisture vapor from the interior. These so-called housewrap products are used with the objectives of increasing personal comfort, improving heating/cooling efficiency, and prolonging the life of the structure. Ideally, the fabric should repel rain and wind, while allowing moisture generated in the interior of the structure to escape, in order to prevent excessive moisture buildup in the interior. Another important criteria is the ability to withstand the effects of weathering and exposure during and after construction.

During construction, barrier fabrics are applied over external and internal walls in a continuous fashion and are used as a temporary cover for windows and doors. The fabric may be exposed to the elements for a considerable period of time prior to the completion of the structure. This causes many existing products to degrade and fail. In addition, the fabric should have enough tear strength and puncture resistance to minimize damage during construction activities. The material is tacked into place, and a frequent problem is the tearing of the fabric from the staples.

Of the currently available materials, none offer all of the combined properties which are desired. Most available products degrade too rapidly or have insufficient barrier properties, or have insufficient tear and puncture resistance.

Various techniques have been proposed for imparting limited porosity to a film or sheet. For example, woven and non-woven materials have been coated with polymeric materials that are filled with substances which cause polymer to form fissures or openings when the filler is dissolved from the structure, or when the coated fabric is worked or heated. In U.S. Pat. No. 4,684,568, a fibrous web is coated with polypropylene resin and the sheet is then calendered to provide limited permeability.

SUMMARY OF THE INVENTION

In accordance with the present invention, an impermeable polymer film is laminated to a porous substrate such as a spunbonded web. The composite web is then needled with fine diameter, tapered needles to render the web microporous. The resulting web is permeable to vapor but impermeable to liquids. Also, the fabric is tough, durable and is easy to handle.

The degree of penetration of the needles and the frequency of the micro-punctures may be varied to control the porosity of the fabric. The fabric does not lose strength or any desirable properties by reason of exposure to the elements and provides and effective housewrap. Preferably, the porous substrate is a non-woven spunbonded polypropylene fabric, and the impermeable film is polypropylene.

THE DRAWING

DESCRIPTION OF THE PREFERRED EMBODIMENTS

Figure 1:
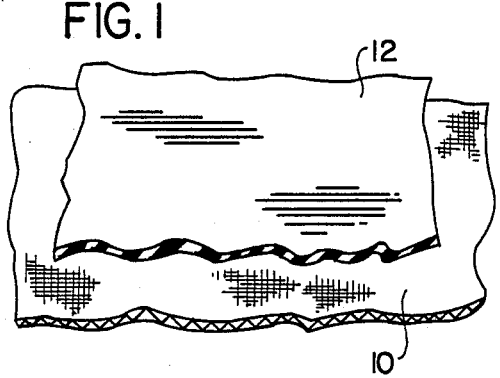
FIG. 1 is a perspective view of the product of the present invention.

As shown in FIG. 1, a porous web or sheet 10 is laminated or bonded to an initially impermeable polymer film 12 to form a composite laminate. As described herein, the film layer 12 is then mechanically pierced to provide a large number of microperforations through the composite web.

The porous web is preferably fibrous in nature and is treated with, or contains, sufficient conventional chemical stabilizers to retard oxidation and ultraviolet degradation when in use. Particularly suitable materials include non-woven spunbonded polymeric webs. One specific example is a spunbonded fabric of polypropylene sold under the trademark "Typar" or "Tekton." Such webs may be produced as described in U.S. Pat. Ser. No. 4,582,750. Such fabrics have excellent strength characteristics and may be obtained in a large variety of basic weights, i.e., from about 1.9 to about 6 or greater oz. per sq. yd.

An impervious polymer film is then laminated to the porous web in a continuous fashion. Most conveniently, the film is applied by a conventional hot cast extrusion process such that the film is thermally bonded to the porous web during the application procedure. In this procedure, the porous web is moved under a nozzle slit which supplies the molten polymer in a uniform manner. Other laminating procedures may be employed but may be less desirable because of additional manufacturing cost. For example, a sepaerately manufactured film may be laminated to the porous web by the application of heat and pressure, or by the use of a thermoplastic or other adhesive, provided that the adhesive does not interfere with the subsequent formation of pores through the laminate. The coating of film thickness is not critical, and may range in the order of from about 0.3 to 1 mil.

While various film forming polymers may be employed, the preferred polymer for the ease of lamination is polypropylene. Chemical stabilizers such as U.V. absorbers and antioxidants are preferably incorporated into the film. The film also contains a pigment, such as white or light color or metallic pigment to aid in the reflection of sunlight.

Figure 4:
FIG. 4 is a side view of a needle used in the process of the present invention.

Following the laminating or coating procedure, the resulting web is then needled with sharp, pointed needles in order to provide microopenings and limited porosity through the otherwise impermeable film. The shape of a suitable needle 40 is indicated in FIG. 4. As shown in the figure, the needle terminates in a sharp point 42 and tapers outwardly toward the base in the form of a cone. This is unlike a barbed needle used in the manufacture of felts and mechanically entangled fabrics.

The composite web is passed through a conventional needle loom having a large number of the needles shown in FIG. 4 mounted therein. The base of the needles are mounted on a horizontal board which reciprocates vertically. The needles extend through a stripper plate and through the web, which is supported by a horizontal bed plate. The web is moved lengthwise and stepwise after each upward reciprocation of the needle plate. Due to the nature of the procedure, the needle marks will be randomly located.

The use of the foregoing procedures allows control of the number of needle punctures per given area as well as the size of the micropunctures. The puncture density may be controlled by the number of needles employed and the number of puncture strokes relative to the degree of movement of the web. Preferably, the puncture density is in the order of from about 25 to 90 per square inch, and most preferably from about 45 to about 65.

The size of the opening made by the needle may be controlled by the depth of penetration in the web. The size of the openings preferably should be kept as small as possible to prevent excessive transmission of liquids. The diameter of the needle at the area of puncture is in the order of from about 0.004 inches to about 0.02 inches, preferably from 0.006 to 0.012 inches. It will be understood that the size of the resulting puncture or opening will be somewhat smaller, perhaps five to 20 percent, due to the resiliency and contraction of the film upon withdrawal of the needle. The angle of the needle at the apex of the tip 42 is preferably in the order of from about 4 to about 10 degrees to allow for significant penetration while maintaining a sufficiently small puncture size.

Figure 2:
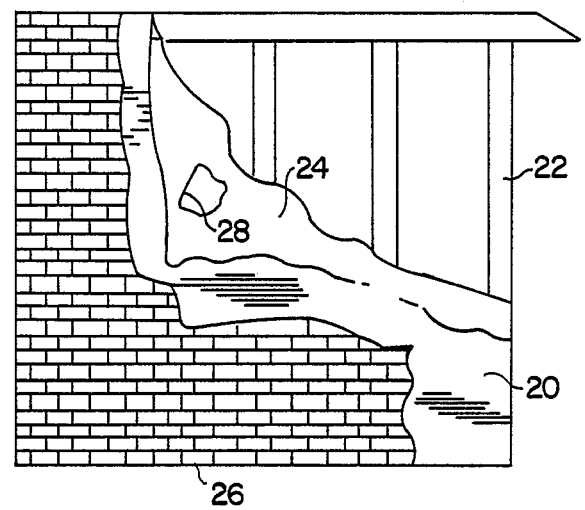
FIG. 2 is an elevation of the product of FIG. 1 as applied to building structure framing.

FIG. 2 illustrates the application of the housewrap 20 of the present invention to a building construction comprising a wooden frame 22, sheathing 24 and an exterior of various materials 26 such as brick. The wrap 20 is normally installed between the sheathing 24 and the exterior 26. During and after construction, the sheathing prevents entry of rain and wind and also covers any openings, such as 28, which may result from construction.

Figure 3:
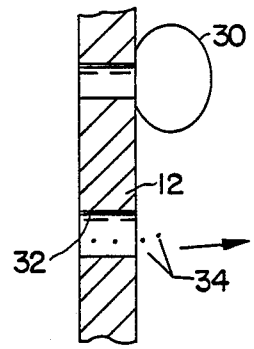
FIG. 3 is a schematic sectional view through the fabric illustrating the mechanism involved in the liquid barrier and vapor transmission properties of the composite sheet or fabric.

FIG. 3 schematically illustrates the properties of the barrier fabric, particularly the film portion 12. The polymer film surface, due to its relatively high surface energy, causes drops of liquid water 30 to form a ball or bead, rather than to wet the surface. As a result, water tends to shed form the surface, and the drops are too large to pass through the micropenings 32. On the other hand, water vapor molecules, schematically illustrated at 34, can freely pass through the openings 32 from the other direction, provided that there is differential in vapor pressure on opposite sides of the film.

Figure 5:
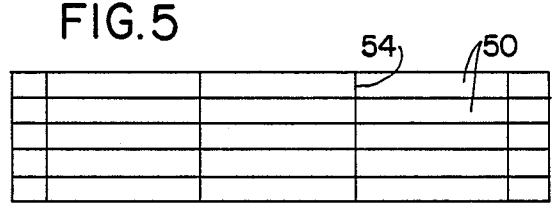
FIG. 5 is a side view of a bundle of rolls of the product of the present invention.
Figure 6:
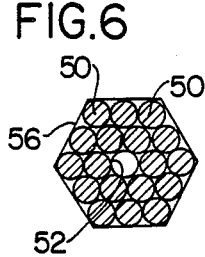
FIG. 6 is an end view of the bundle shown in FIG. 5.

As shown in FIGS. 5 and 6, the fabric of the present invention is provided in the form of long sheets which are wound into separate rolls 50 for case of use at the construction site. As shown, the rolls 50 may be provided in a bundle of a plurality of rolls which are arranged around a central hollow core 52, with the bundle being secured by strapping 54. The outside diameter of the core is approximately the same as the outer diameter of the filled rolls. This enables the filled rolls to be securely disposed around the core in tangential contact with each other and/or the central core in a secure geometric pattern.

The hollow central core allows the use of a pole or the tine or leg of a fork lift truck to be used in transporting the bundle. In addition, an outer protective cover 56, such as cardboard, may be wrapped and secured around the bundle in the same geometrical pattern as the bundles, such as the hexagon shown in FIG. 6.

The product of the present invention provides a reliable, stable, strong and durable housewrap. The moisture transmission rate, measured via the ASTM Method E-96 is in the order of 8 to 20 g/100 sq. in./24 hrs. The Gurley Porosity, measured by Tappi Method T-460 is in the order of 10 to 20 sec./100 cc/6.4 sq. cm. The water resistance, via AATCG Method 127 is in the order of 8 to 20 inches of water.

As an example of the present invention, a spunbonded, non-woven polypropylene web was coated with a 0.75 mil thick polypropylene film. The composite was needled with conical shape needles to a penetration depth wherein the needle was 0.008 inches in diameter. The resulting material had a basis weight of 2.4 oz./sq. yd., and a total thickness of 0.0095 inches. Rolls of material, 9 by 111 feet, have a weight of 16.5 lbs. per roll. The material exhibited the properties described herein, and the trap tear of the composite remained at 32 lbs. after 90 days of direct exposure.

What is claimed is:

1. Method of producing a barrier fabric which is permeable to liquid vapors and impermeable to liquids, said method comprising the steps of first laminating a vapor impermeable polymer film to a reinforcing porous fibrous web to provide a composite web and then needling the film of the composite web with tapered needles to provide a plurality of micropores through said film, said micropores being sufficiently small to prevent substantial transmission of liquids and sufficiently large to permit transmission of vapors.

2. The method of claim 1 wherein said film is needled by puncturing the film with a plurality of said needles, the diameter of said needles at the area of puncture being in the order of from about 0.004 to about 0.02 inches.

3. The method of claim 1 wherein the porous fibrous web is non-woven spunbonded polypropylene.

4. The method of claim 1 wherein said film is polypropylene.

5. The method of claim 1 wherein the number of micropores per square inch in the film is from about 25 to about 90.

6. The method of claim 1 wherein the web is wound into a plurality of rolls, said rolls are arranged around a hollow tube to form a bundle, and said bundle is secured together.

7. The method of claim 1 wherein the moisture transmission rate of the composite web is from about 8 to about 20 g/100 sq. in./24 hrs.

8. The method of claim 1 wherein the angle of said needles from the apex of the tips thereof is from about 4 to about 10 degrees.

9. A barrier fabric comprising a porous fibrous layer, a moisture impermeable film laminated to said fibrous layer to provide a composite fabric, and a plurality of punctures through said film, said punctures being of a size sufficient to allow the transmission of water vapor and of a size insufficient to allow substantial penetration of liquid water.

10. the barrier fabric of claim 9 wherein said film is polypropylene having a thickness of from about 0.3 to about 1 mil.

11. Method of producing a fabric with limited permeability, said method comprising the steps of first laminating a vapor impermeable polymer film to a reinforcing porous fibrous web to provide a composite web, and then needling the film of the composite web with tapered needles to provide a plurality of micropores through said film.

12. A method for transporting rolls of fabric comprising the steps of first assembling a plurality of rolls of fabric into a bundle around a hollow tube which is coextensive with the rolls and wherein the rolls are arranged in a stable geometrical pattern around the tube, securing the bundle, and lifting and transporting the bundle by inserting a support into the hollow tube.

* * * * *